United States Patent Office 2,801,272
Patented July 30, 1957

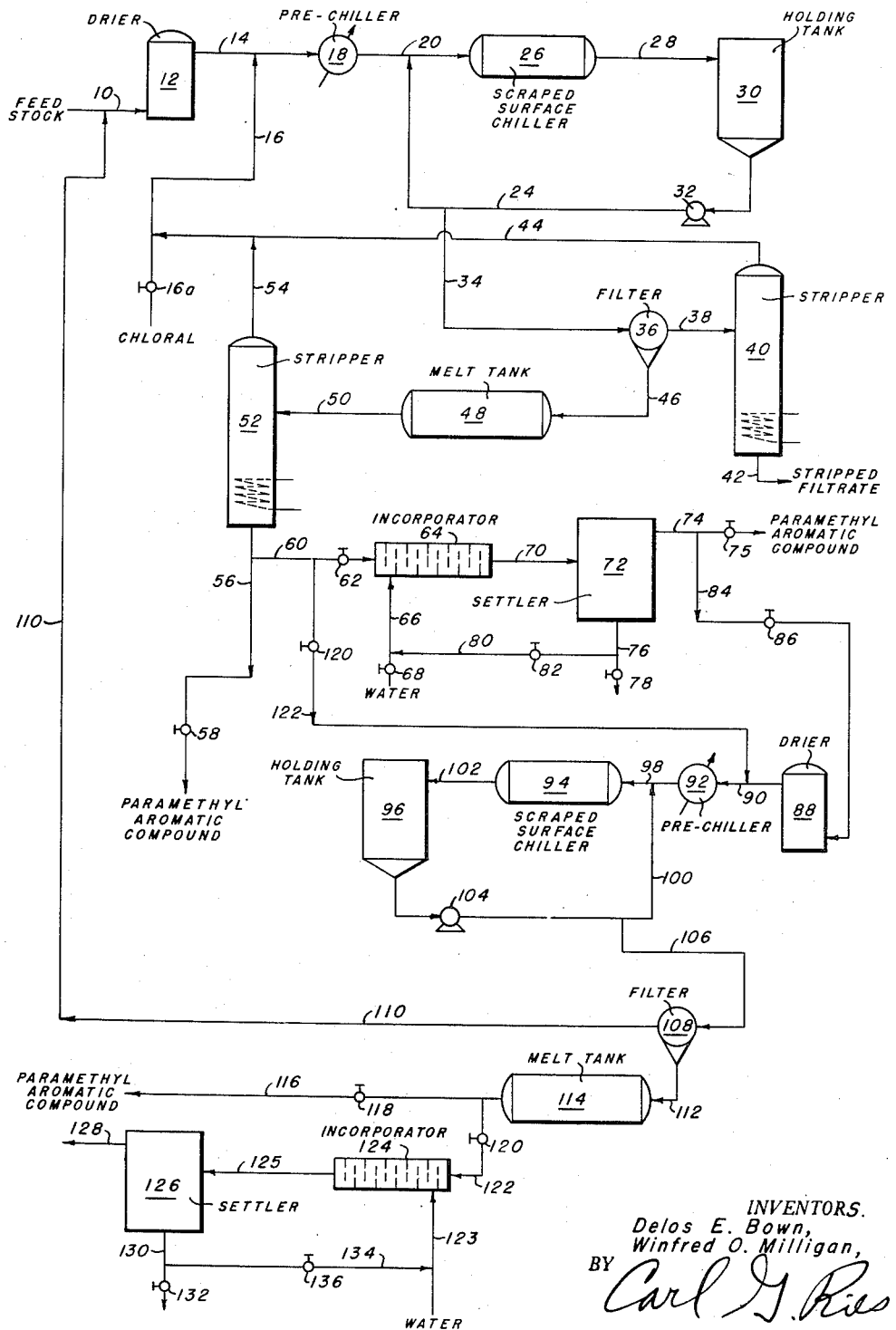

2,801,272

PROCESS FOR RECOVERING POLYMETHYL AROMATIC COMPOUNDS CONTAINING PARAMETHYL GROUPINGS BY FRACTIONAL CRYSTALLIZATION IN THE PRESENCE OF CHLORAL

Delos E. Bown, Baytown, and Winfred O. Milligan, Houston, Tex., assignors, by mesne assignments, to Esso Research and Engineering Company, Elizabeth, N. J., a corporation of Delaware Application September 30, 1955, Serial No. 537,691

12 Claims. (Cl. 260—674)

This invention relates to a selective crystallization process for recovering polymethyl aromatic compounds containing paramethyl groupings, such compounds being hereinafter referred to as paramethyl aromatic compounds. More particularly, this invention relates to an improved process for the selective crystallization and filtration recovery of paramethyl aromatic compounds wherein paramethyl aromatic compound filtrate loss is reduced.

The process of the present invention may be briefly described as a process comprising the steps of mixing a feed stock comprising a mixture of closely boiling aromatic hydrocarbons containing a paramethyl aromatic hydrocarbon with about 60 to 100 volume percent of chloral (trichloracetaldehyde, $Cl_3CCHO$), chilling the resultant mixture to about the lowermost temperature of selective crystallization to be employed, such temperature being about the lowermost temperature of selective crystallization of the paramethyl compound, to form a slurry of a chloral-paramethyl aromatic cocrystallized solid in a mother liquor containing uncrystallized chloral and paramethyl aromatic compounds, filtering the resultant slurry to obtain a filtrate fraction and a filter cake fraction, and substantially completely removing chloral from the filter cake fraction to provide a substantially chloral-free product comprising the desired paramethyl aromatic compound.

In accordance with a preferred embodiment of the present invention, the substantially chloral-free product is subjected to a further fractional crystallization step in the absence of added chloral in order to provide a purified product consisting essentially of the paramethyl aromatic compound.

In accordance with a still further embodiment of the present invention the substantially chloral-free product is washed in water prior to or subsequent to further purification in order to remove residual amounts of chloral which may be contained therein.

Representative paramethyl aromatic compounds that may be recovered by the process of the present invention include paraxylene (1,4-dimethylbenzene), durene (1,2,3,4-tetramethylbenzene), pseudocumene (1,2,4-trimethylbenzene), etc. The feed stocks to be employed in accordance with the present invention are mixtures of closely boiling cyclic hydrocarbon compounds, at least one of the compounds in the mixture being a polymethyl aromatic compound containing a paramethyl grouping. Representative examples of such feed stocks include mixtures of isomeric ortho-, meta-, and paraxylene containing about 10 to 25 volume percent of paraxylene, aromatic hydrocarbon fractions boiling between about 365° and 425° F. and containing about 5 to 20 volume percent of durene, etc.

In accordance with the present invention, such a feed stock is admixed with about 60 to 100 volume percent of chloral and the resultant mixture is then chilled to about the lowermost temperature of selective crystallization to be used to form a slurry of a chloral-paramethyl aromatic co-crystallized solid in a mother liquor containing uncrystallized components of the mixture including uncrystallized chloral and uncrystallized paramethyl aromatic compound. Normally, the lowermost temperature to be employed will be within the range of about —50° to —110° F., the temperature to be employed in a given instance being dependent upon the composition of the feed stock and, particularly, upon the temperature at which other aromatic components of the feed stock will form crystalline eutectics with the paramethyl aromatic compound. As indicated, the lowermost temperature to be used is about the lowermost temperature of selective crystallization of the paramethyl aromatic hydrocarbon.

The thus formed slurry is filtered to obtain a filtrate fraction and a filter cake fraction. The filter cake is then substantially freed from chloral to obtain a product which will normally comprise at least about 60 weight percent of paramethyl aromatic compound (e. g., about 62 to 85 weight percent of paramethyl aromatic compound), from which substantially chloral-free material may be recovered as product. However, if a product of greater purity is desired, the substantially chloral-free material may be further processed in any suitable manner, as for example by subsequent selective crystallization in the absence of added chloral, in order to obtain a high purity paramethyl aromatic product. When a high purity paramethyl aromatic product is to be obtained by subsequent selective crystallization and filtration, it is preferable that such selective crystallization and filtration purification step be conducted at about the uppermost temperature of selective crystallization of the paramethyl aromatic compound (i. e., at a temperature not less than about 40° F. lower than the temperature at which the paramethyl aromatic compound will commence to crystallize).

The process of the present invention will now be described in conjunction with the accompanying drawing wherein the single figure is a schematic drawing illustrating a preferred embodiment of the present invention.

The preferred embodiment of the present invention will be described in conjunction with the recovery of paraxylene from a mixture of isomeric xylenes. It will be understood, however, that the process is equally applicable to the selective crystallization and recovery of other paramethyl compounds such as durene, pseudocumene, etc.

Turning now to the drawing, the numeral 10 designates a charge line for the introduction of a suitable feed stock, in this instance a mixture of isomeric xylenes containing about 10 to 20 volume percent of paraxylene to a suitable drier 12 wherein any residual amounts of water contained in the feed stock are removed. The feed stock is discharged from the drier 12 through a line 14 and is there admixed with about 60 to 100 volume percent of chloral, the chloral being added through a charge line 16. The thus formed mixture of chloral and feed stock is passed through a pre-chiller 18 wherein the mixture is chilled to a temperature slightly above the temperature of crystallization of the paraxylene.

The pre-chilled mixture is then processed in a manner to form a slurry of a chloral-paraxylene co-crystallized solid in a mother liquor containing uncrystallized chloral and uncrystallized paraxylene. One manner in which this can be accomplished is by mixing the pre-chilled mixture with a pre-formed slurry of the above described nature. Thus, for example, the pre-chilled feed mixture is discharged from the pre-chiller 18 into a line 20 wherein it is admixed with a stream of slurry charged to the line 20 through a line 24 and derived in a manner to be explained. The line 20 discharges into a scraped surface chiller 26 of any suitable construction wherein the material charged thereto is chilled to a temperature within the range of about —90° to —110° F. (about the lower-most temperature of selective crystallization of the paraxylene) whereby a homogeneous slurry of chloral-paraxylene co-crystallized solid in a mother liquor is obtained. The homogeneous slurry is passed from the scraped surface chiller 26 through a line 28 to a holding tank 30 wherein the slurry is maintained for an average residence time within the range of about 0.5 to 4 hours. In order to maintain the slurry in the holding tank at the desired temperature, a stream of slurry is withdrawn therefrom through the line 24, mentioned above, such line containing a pump 32. As a result, the withdrawn stream of slurry is recycled through the scraped surface chiller 26 to provide for positive temperature control in the holding tank 30.

A portion of the slurry passing through the recycle line 24 is withdrawn therefrom through a branch line 34 and from thence is charged to a filtration zone 36 wherein suitable filtration means, such as a basket-type centrifuge, is employed to separate the charged slurry into a filtrate fraction and a filter cake fraction.

Filtrate is discharged from the filtration zone 36 through a line 38 and is preferably stripped of chloral in a stripping zone 40; zone 40 comprising, for example, suitable distillation means. Stripped filtrate is discharged as bottoms from the stripping zone 40 through a bottoms line 42 for discard from the system and the chloral is taken overhead through a line 44 for recycle to the chloral charge line 16. Make-up chloral may be introduced by opening valve 16a in line 16.

The filter cake fraction obtained in the filtration zone 36 is discharged therefrom through a conduit 46 leading to a melt tank 48 wherein the filter cake fraction is liquefied. The thus obtained melt is discharged from the melt tank 48 through a line 50 and passed to suitable stripping means 52 such as a distillation column wherein chloral is stripped from the melt. The chloral is taken overhead through a line 54 for recycle, being mixed in the line 44 with chloral derived from the filtrate stripping zone 40.

The stripped melt will normally comprise at least about 60 to 85 percent by weight of paraxylene and is discharged from the stripping zone 52 through a bottoms line 56 containing a valve 58. The thus obtained bottoms fractions 56 may be discharged as product without further treatment if desired by opening valve 58. Alternatively, all or a portion of the bottoms fraction 56 may be passed through a side delivery line 60 containing an opened valve 62 for further processing.

As one example, the impure liquid paraxylene fraction taken as bottoms through the line 56 may be washed with water in any suitable manner to remove residual amounts of chloral present therein due to imperfect stripping. This may be accomplished, for example, by charging the impure material to a suitable mixing device such as an incorporator 64 to which water is also charged through a charge line 66 containing a valve 68. The mixture of water and impure material is discharged from the incorporator 64 through a line 70 leading to suitable separation means such as a settler 72 wherein phase separation occurs. The paraxylene containing organic product, after being freed from residual chloral, is discharged from the settler 72 through an overhead line 74 containing a valve 75 and the wash water is discharged as bottoms through a discharge line 76 containing a valve 78.

If desired, all or a portion of the wash water may be recycled to the incorporator 64 by means of a recycle line 80 containing a valve 82, the line 80 leading from the wash water discharge line 76 to the water charge line 66. In this manner, the wash water may be utilized until the washing efficiency of the same is impaired due to an excessive build-up in chloral concentration. When this happens, the valve 82 may be closed and the valve 78 may be opened to discharge spent wash water from the system. As indicated, this may also be accomplished continuously by discharging a portion of the wash water from the settling zone 72 by way of the line 78 and recycling another portion of the wash water through the recycle line 80.

The chloral-free paraxylene-containing material discharged from the settler 72 may be recovered as product through the line 74 by opening valve 75 or, if desired, it may be further treated in order to obtain a high purity paraxylene product.

As an example of subsequent treatment, the valve 75 may be closed and the paraxylene-containing material discharged from the line 74 into a branch line 84 containing a valve 86 leading to a drier 88 wherein any entrained water which may be present is removed. The dried material is discharged from the drier 88 through a line 90 leading to a pre-chiller 92 wherein the impure material is chilled to a temperature slightly above the initial temperature of crystallization of the paraxylene. The pre-chilled material is then subjected to a further processing operation whereby the material is chilled to a temperature below the temperature of crystallization of the paraxylene but in the uppermost range of selective crystallization therefor. In the case of paraxylene, the material may be chilled to a temperature within the range of about —20° to +20° F. for this purpose. A temperature of about 0° F. is preferred.

One manner in which this can be accomplished is through the provision of a second scraped surface chiller 94 and a second holding tank 96. The pre-chilled impure material is discharged from the pre-chiller through a line 98 and while flowing therethrough is admixed with a pre-formed slurry of paraxylene crystals in a mother liquor rich in paraxylene, the source of which will be described. The mixture is passed from the line 98 into the scraped surface chiller 94 wherein a homogeneous slurry is formed by chilling the mixture to a temperature within the range of about —20° to about +20° F. The homogeneous slurry is passed from the scraped surface chiller 94 through a line 102 to a second holding tank 96 wherein it is maintained for an average residence time of at least about 30 minutes. Temperature is positively controlled in the holding tank 96 by recycling a portion of the slurry through the line 100, the line 100 being provided with a pump 104 for this purpose.

A portion of the slurry recycled through the line 100 is withdrawn therefrom through a branch line 106 and charged to a filtration zone containing suitable filtering means such as a basket-type centrifuge 108 in order to obtain a filter cake consisting of about 95 weight percent or more of paraxylene and a filtrate fraction containing an appreciable portion of uncrystallized paraxylene (e. g., about 40 to 60 weight percent of uncrystallized paraxylene). The filtrate is discharged from the centrifuge 108 through a recycle line 110 for admixture with fresh feed stock charged to the process through the feed stock charge line 10. The filter cake of purified paraxylene is discharged from the centrifuge 108 through a conduit 112 leading to a melt tank 114 wherein the filter cake is liquefied to provide liquid paraxylene of about 95 weight percent or more purity. The thus obtained product is discharged from the melt tank 114 through a discharge line 116 containing an open valve 118 to suitable storage or subsequent processing means.

As an example of another purification process, the valve 62 in the branch line 60 leading from the bottoms line 58 may be closed and a valve 120 in a delivery line 122 branching from the line 60 and leading to the charge line 90 for the second pre-chiller 92 may be opened. As a result, the incorporator 64, the settler 72 and the drier 88 are bypassed. The impure paraxylene material charged to the pre-chiller 92 is processed in the above described manner in order to obtain a purified paraxylene product. That is to say, the impure material is pre-chilled in the pre-chiller 92 and discharged therefrom through the line 98 for admixture with the recycle slurry delivered thereto through the recycle line 100. The thus chilled mixture is passed from the scraped surface chiller 94 through the line 102 to the holding tank 96. The desired temperature (i. e., a temperature in the range of about −20° to +20° F.) is maintained in the holding tank 96 by recycling a portion of the slurry to the scraped surface chiller 94 through the recycle line 100 containing the pump 104.

As indicated, a portion of the recycle slurry is withdrawn from the recycle line 100 through the branch line 106 leading to the centrifuge 108. The centrifuge 108 is operated in the indicated manner to provide a filtrate fraction which is recycled through the recycle line 110 and a filter cake fraction which is discharged through the conduit 112 leading to the melt tank 114. The liquefied, purified paraxylene product is discharged from the melt tank 114 through the discharge line 116. However, the product obtained in the just described manner will normally contain a residual amount of chloral which is preferably removed by a water washing operation. Thus, for example, the valve 118 in the discharge line 116 may be closed and a valve 120 in a branch line 122 may be opened, the line 122 leading to suitable water washing apparatus such as an incorporator 124 and a settling tank 126.

In this situation, the chloral containing paraxylene product is charged to the incorporator 124 and water is also charged to the incorporator 124 through a water charge line 123. The water and chloral containing paraxylene product are intimately mixed in the incorporator 124 and the mixture is then passed by way of a line 125 to a suitable separating means such as settling tank 126. Phase separation occurs in the settling tank 126 and a purified, chloral-free paraxylene product is discharged therefrom through the line 128 while the wash water is discharged therefrom through a water discharge line 130 containing a valve 132.

There may also be provided a recycle line 134 containing a valve 136 interconnecting the water discharge line 130 and the water charge line 123. When this is done, a portion of the spent wash water may be discharged through the line 130 and another portion thereof recycled through the line 134 for admixture with fresh wash water flowing through the line 123.

As has been indicated, paramethyl aromatic compounds other than paraxylene may be recovered in accordance with the embodiments of the present invention described above. Thus, for example, an aromatic hydrocarbon fraction boiling between about 365° and 425° F. and containing about 10 volume percent of durene may be processed to give a product comprising 95 weight percent or more of durene, in accordance with the processing technique described with respect to Fig. 1. In this instance, however, the lowermost temperature of crystallization to be employed in the scraped surface chiller 26 and the holding tank 38 is preferably in the range of about −50° to about −70° F. and the about uppermost temperature of crystallization to be employed in the scraped surface chiller 94 and the holding tank 96 is preferably in the range of about +90° to about +110° F.

The process of the present invention may also be considered in conjunction with the following specific example, given by way of illustration and not by way of limitation, wherein a feed stock having a composition set forth in Table I was treated in the manner to be described.

TABLE I

| Analysis, Wt. Percent | Feed Stock "A" | Feed Stock "B" |
| --- | --- | --- |
| Toluene | 2.3 | 2.7 |
| Ethylbenzene | 17.6 | 21.0 |
| Paraxylene | 15.5 | 18.1 |
| Metaxylene | 40.0 | 46.4 |
| Orthoxylene | 20.3 | 11.0 |
| C₉ Aromatics | 3.0 | |
| Non-Aromatics | 1.3 | 0.8 |

*Example I*

A portion of a feed stock having the composition set forth in Table I was chilled to a temperature of about −105° F. to form a slurry which was filtered in a basket type centrifuge whereby there was obtained a filtrate containing about 5.4 weight percent of paraxylene.

A second portion of the feed stock was admixed with about 30 volume percent of chloral and chilled to a temperature of about −105° F. to form a slurry which was filtered, whereby there was obtained a filtrate containing about 9.4 weight percent of paraxylene.

A third portion of the feed stock was admixed with about 60 volume percent of chloral and chilled to a temperature of about −110° F. to form a slurry which was centrifuged to provide a filtrate containing about 4.3 weight percent of paraxylene.

A fourth portion of the feed stock was mixed with about 100 volume percent of chloral and chilled to a temperature of about −110° F. to provide a slurry which was centrifuged to give a filtrate containing about 3.7 weight percent of paraxylene.

The results are summarized in Table II.

TABLE II.—PARAXYLENE FILTRATE CONCENTRATION

| Portion | Paraxylene Content of Filtrate, weight percent | Percentage Change in Paraxylene Content, Compared with Portion 1 |
| --- | --- | --- |
| 1 | 5.4 | |
| 2 | 9.4 | +80 |
| 3 | 4.3 | −20 |
| 4 | 3.7 | −30 |

From Table II it will be seen that when the feed stock was chilled without dilution there was obtained a filtrate containing 5.4 weight percent of paraxylene and that when about 30 volume percent of paraxylene was added to the feed stock unsatisfactory results were obtained in that the filtrate of portion 2 contained 9.4 weight percent of paraxylene (an increase in paraxylene filtrate content of about 80%). On the other hand, in the case of portions 3 and 4, which were processed in accordance with the present invention, and wherein the feed stock was mixed with 60 volume percent and 100 volume percent, respectively, of chloral, there was a significant reduction in paraxylene filtrate content. Thus, in the case of portion 3, the paraxylene filtrate content was reduced by about 20 percent as compared with portion 1 and, in the case of portion 4, the paraxylene content was reduced by about 30 percent as compared with portion 1.

Equivalent reduction in paramethyl aromatic compound filtrate content is obtained when an aromatic hydrocarbon fraction boiling between about 365° and 425° F. and containing about 10 volume percent of durene is admixed with about 60 to 100 volume percent of chloral and chilled to a temperature of about −60° F. to form a slurry of durene crystals in a mother liquor upon centrifugation of such slurry.

What is claimed is:

1. A process for the recovery of a C₈ to C₁₀ polymethyl benzene containing a paramethyl grouping from a feed stock comprising a mixture of aromatic hydrocarbon compounds containing said paramethyl aromatic compound which comprises the steps of mixing said feed stock with about 60 to 100 volume percent of chloral, chilling the resultant mixture to about the lowermost temperature of selective crystallization of said paramethyl aromatic compound to be used to form a slurry of chloralparamethyl aromatic co-crystallized solid in a mother liquor containing uncrystallized chloral and uncrystallized paramethyl aromatic compound, filtering said slurry to obtain a filtrate fraction and a filter cake fraction, and removing chloral from said filter cake fraction.

2. A process as in claim 1 wherein the feed stock comprises a mixture of isomeric xylenes and wherein the paramethyl aromatic compound is paraxylene.

3. A process as in claim 1 wherein the feed stock is a durene-containing aromatic hydrocarbon feed stock boiling within the range of about 365° to 425° F. and wherein the paramethyl aromatic compound is durene.

4. A process for the recovery of a $C_9$ to $C_{10}$ polymethyl benzene containing a paramethyl grouping from a feed stock comprising a mixture of aromatic hydrocarbon compounds containing said paramethyl aromatic compound which comprises the steps of mixing said feed stock with about 60 to 100 volume percent of chloral, chilling the resultant mixture to about the lowermost temperature of selective crystallization of said paramethyl aromatic compound to be used to form a slurry of chloral-paramethyl aromatic co-crystallized solid in a mother liquor containing uncrystallized chloral and uncrystallized paramethyl aromatic compound, filtering said slurry to obtain a filtrate fraction and a filter cake fraction, liquefying said filter cake fraction and stripping chloral therefrom, chilling the liquefied stripped paramethyl aromatic compound-containing material to about the uppermost temperature of selective crystallization of said paramethyl aromatic compound to form a second slurry consisting of crystals of said paramethyl aromatic compound in a second mother liquor rich in uncrystallized paramethyl aromatic compound, filtering said second slurry to obtain a second filtrate fraction and a second filter cake fraction, and recovering purified paramethyl aromatic hydrocarbon from said second filter cake fraction as product.

5. A process as in claim 4 wherein residual amounts of chloral remaining after the stripping operation are subsequently removed by water washing prior to recovery of the product.

6. A process as in claim 5 wherein the material is water washed prior to the formation of said second slurry.

7. A process as in claim 5 wherein the water washing is employed subsequent to formation of said second filter cake.

8. A process for the recovery of paraxylene from a mixture of isomeric xylenes containing about 10 to 25 volume percent of paraxylene which comprises the steps of mixing said feed stock with about 60 to 100 volume percent of chloral, chilling said thus-formed mixture to a temperature within the range of about —90° to about —115° F. to form a slurry of paraxylene-chloral co-crystallized solid in a mother liquor, filtering said slurry to obtain a filtrate fraction comprising said mother liquor and a filter cake fraction comprising said co-crystallized solid and removing chloral from said filter cake fraction.

9. A process as in claim 8 wherein, subsequent to removal of the chloral, the filter cake fraction is washed with water.

10. A process for the recovery of paraxylene from a mixture of isomeric xylenes containing about 10 to 25 volume percent of paraxylene which comprises the steps of mixing said feed stock with about 60 to 100 volume percent of chloral, chilling said thus-formed mixture to a temperature within the range of about —90° to about —115° F. to form a first slurry of paraxylene-chloral co-crystallized solid in a mother liquor, filtering said first slurry to obtain a first filtrate fraction comprising said mother liquor and a first filter cake fraction comprising said co-crystallized solid, liquefying said first filter cake fraction, stripping chloral therefrom to obtain partially purified paraxylene, chilling the partially purified paraxylene to a temperature within the range of about —20° to about +20° F. to form a second slurry consisting of crystals of paraxylene in a second mother liquor rich in uncrystallized paraxylene, filtering said second slurry to obtain a second filtrate fraction and a second filter cake fraction and recovering purified paraxylene from said second filter cake fraction as product.

11. A process as in claim 10 wherein said second filter cake fraction is liquefied, and washed with water to remove residual amounts of chloral therefrom.

12. A process as in claim 10 wherein the partially purified paraxylene is washed with water, and wherein the washed partially purified paraxylene is dried prior to the chilling of the same to form said second slurry.

References Cited in the file of this patent

FOREIGN PATENTS 677,368   Great Britain _____ Aug. 13, 1952